United States Patent
Chung et al.

(10) Patent No.: US 7,991,990 B2
(45) Date of Patent: Aug. 2, 2011

(54) MEMORY ACCESS SYSTEM AND MEMORY ACCESS METHOD THEREOF

(75) Inventors: Chien-Ping Chung, Taipei (TW); Lin-Hung Chen, Taipei (TW)

(73) Assignee: VIA Technologies, Inc., Taipei (TW)

( * ) Notice: Subject to any disclaimer, the term of this patent is extended or adjusted under 35 U.S.C. 154(b) by 836 days.

(21) Appl. No.: 12/000,591

(22) Filed: Dec. 14, 2007

(65) Prior Publication Data

US 2008/0222409 A1    Sep. 11, 2008

(30) Foreign Application Priority Data

Mar. 7, 2007   (TW) ................. 96107935 A

(51) Int. Cl.
  G06F 9/24   (2006.01)
  G06F 9/00   (2006.01)
  G06F 13/00  (2006.01)
  G06F 9/26   (2006.01)
  G06F 9/34   (2006.01)

(52) U.S. Cl. ............... 713/2; 713/1; 711/103; 711/202; 711/218

(58) Field of Classification Search ............ 713/1, 2; 711/103, 202, 218
See application file for complete search history.

(56) References Cited

U.S. PATENT DOCUMENTS

| | | |
|---|---|---|
| 5,473,775 A | 12/1995 | Sakai et al. |
| 5,615,335 A | 3/1997 | Onffroy et al. |
| 6,112,303 A * | 8/2000 | Stancil ............... 713/2 |
| 6,321,332 B1 * | 11/2001 | Nelson et al. ....... 713/2 |
| 7,657,696 B2 * | 2/2010 | Su et al. ............ 711/103 |
| 2001/0023472 A1 * | 9/2001 | Kubushiro et al. ... 711/103 |
| 2002/0069314 A1 * | 6/2002 | Miyauchi ............ 711/103 |
| 2002/0184467 A1 * | 12/2002 | Saen et al. .......... 711/202 |
| 2004/0250058 A1 * | 12/2004 | Chao ................. 713/2 |
| 2005/0283565 A1 * | 12/2005 | Chiu ................. 711/103 |
| 2005/0283598 A1 * | 12/2005 | Gaskins et al. ..... 713/2 |
| 2006/0200617 A1 * | 9/2006 | Park ................. 711/103 |

FOREIGN PATENT DOCUMENTS

TW    470880    1/2002

* cited by examiner

Primary Examiner — Vincent T Tran
(74) Attorney, Agent, or Firm — Bacon & Thomas, PLLC

(57) ABSTRACT

A memory access system for accessing a basic input output system (BIOS) program is provided. The memory access system includes a flash memory, a CPU, a peripheral component interconnect (PCI) slave, an address converter and a flash memory controller. The flash memory stores a number of BIOS data of the BIOS program, and each BIOS data corresponds to a default BIOS address and is allocated in a flash memory type BIOS address. The CPU delivers a BIOS access instruction. The BIOS access instruction corresponds to a default target address of the default BIOS addresses. After the PCI slave interprets the BIOS access instruction, the address converter converts the default target address into a flash memory type target address, which is one of the flash memory type BIOS address. The flash memory controller accesses the BIOS data allocated at the flash memory type target address accordingly.

15 Claims, 2 Drawing Sheets

MEMORY ACCESS SYSTEM AND MEMORY ACCESS METHOD THEREOF

This application claims the benefit of Taiwan application Serial No. 96107935, filed Mar. 7, 2007, the subject matter of which is incorporated herein by reference.

BACKGROUND OF THE INVENTION

1. Field of the Invention

The invention relates in general to a memory access system, and more particularly to a memory access system for accessing basic input output system program.

2. Description of the Related Art

FIG. 1 is a block diagram of a conventional memory access system 100 for accessing basic input output system (BIOS) program. The memory access system 100 includes a CPU 110, a peripheral component interconnect (PCI) slave 120 and an electrically erasable programmable read-only memory (EEPROM) 130. The memory access system 100 is for accessing a BIOS system program in the EEPROM 130. The CPU 110 delivers a BIOS access instruction, BIOS access instruction corresponds to a default BIOS address. The default BIOS address is within the accessible range of the default BIOS program of the CPU. For example, when the CPU supports 32-bit address and the size of the BIOS program is 512 Kbytes, the default BIOS address ranges between 0xFFFFFFFF and 0xFFF80000 (0xFFFFFFFF subtracted by 512 Kbytes and added by 1). For example, when the CPU 110 delivers a BIOS access instruction whose default BIOS address is 0xFFFFFFF0, the PCI slave 120 interprets the BIOS access instruction to access the data from the default BIOS address 0xFFFFFFF0 of the EEPROM 130. However, the manufacturing cost for the electrically erasable memory and the accessing rate is too slow. Therefore, how to save the cost of the above memory access system and increase the access rate has become an imminent target to be achieved.

SUMMARY OF THE INVENTION

The invention is directed to a memory access system, which stores a BIOS program by a flash memory instead of an electrically erasable programmable read-only memory used in a conventional memory access system, hence saving the use of costive electrically erasable programmable read-only memory.

According to a first aspect of the present invention, a memory access system for accessing a basic input output system (BIOS) program is provided. The memory access system of the invention includes a flash memory, a CPU, a peripheral component interconnect (PCI) slave (Slave), an address converter and a flash memory controller. The flash memory is for storing a number of BIOS data of the BIOS program, wherein each BIOS data corresponds to a default BIOS address and is allocated at a flash memory type BIOS address. The CPU is for outputting a BIOS access instruction. The BIOS access instruction corresponds to a default target address of the default BIOS address. The PCI slave is for interpreting the BIOS access instruction. The address converter is for receiving a BIOS access instruction delivered from the PCI slave and converting the default target address into a corresponding flash memory type target address, which is one of the flash memory type BIOS addresses. The flash memory controller receives a BIOS access instruction delivered from the address converter and then accesses the BIOS data allocated at the flash memory type target address accordingly.

According to a second aspect of the present invention, a memory access method for accessing a BIOS program in a flash memory. The BIOS program includes a number of BIOS data, and each BIOS data corresponds to a default BIOS address and is allocated at a flash memory type BIOS address. The memory access method includes the following steps: Firstly, a BIOS access instruction corresponding to a default target address of the default BIOS address is delivered. Next, the BIOS access instruction is interpreted. Afterwards, the default target address is converted into a corresponding flash memory type target address which is one of the above flash memory type BIOS addresses. Afterwards, the BIOS data allocated at the flash memory type target address is accessed from the flash memory.

The invention will become apparent from the following detailed description of the preferred but non-limiting embodiments. The following description is made with reference to the accompanying drawings.

DETAILED DESCRIPTION OF THE INVENTION

Figure 1:
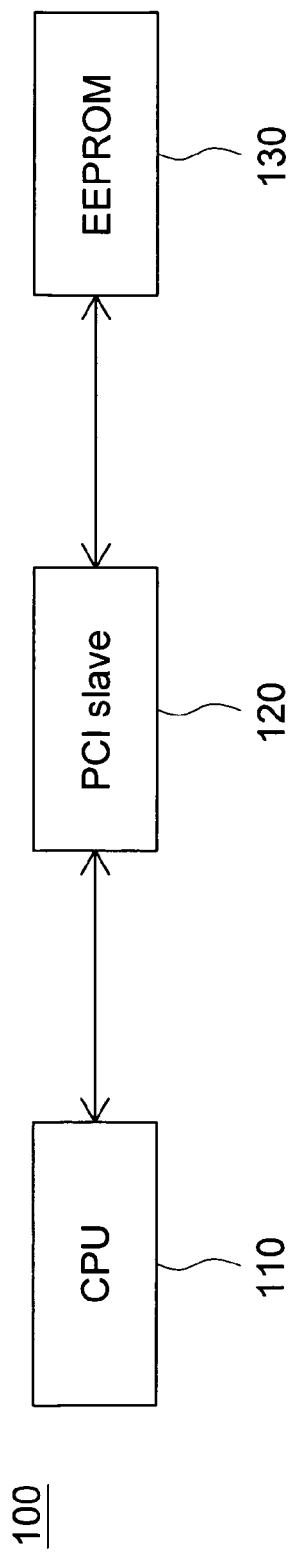
FIG. 1 (Prior Art) is a block diagram of a conventional memory access system 100 for accessing basic input output system (BIOS) program.
Figure 2:
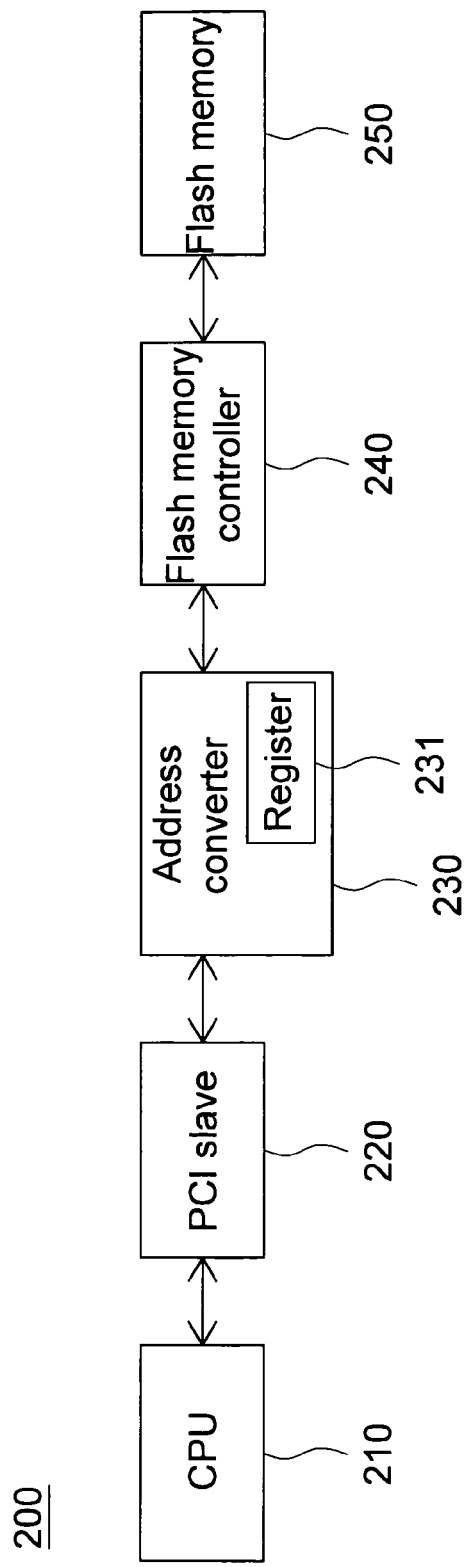
FIG. 2 is a block diagram of a memory access system 200 according to an embodiment of the invention.

Referring to FIG. 2, a block diagram of a memory access system 200 according to an embodiment of the invention is shown. The memory access system 200 is for accessing a basic input output system (BIOS) program. The memory access system 200 includes a CPU 210, a peripheral component interconnect (PCI) slave 220, an address converter 230, a flash memory controller 240, and a flash memory 250.

The flash memory 250 is for storing a number of BIOS data of the BIOS program, and each BIOS data corresponds to a default BIOS address and is allocated at a flash memory type BIOS address. The CPU 210 is for delivering a BIOS access instruction corresponding to a default target address, which is one of the above default BIOS addresses.

The PCI slave 220 is for interpreting the BIOS access instruction into a format adaptable to the flash memory controller 240. The address converter 230 receives the BIOS access instruction delivered from the PCI slave 220, and converts the default target address corresponding to BIOS access instruction into a corresponding flash memory type target address which is one of the flash memory type BIOS addresses.

The flash memory controller 240 receives the BIOS access instruction delivered from the address converter 240 and accesses the BIOS data allocated at the flash memory type target address from the flash memory 250 accordingly.

In the above embodiments of the invention, the size of the BIOS program is exemplified by 512 KB, and the BIOS program includes four data segments B1~B4 each has 128 KB and includes a part of the BIOS data.

The data segments B1~B4 respectively store 4 memory segments M1~M4 of the flash memory 250. The memory segment M1 is the memory segment guaranteed correct when the flash memory 250 is produced. The BIOS program is initially executed at the data segment B1 of the BIOS program. By storing the data segment B1 to the memory segment M1 of the flash memory 250, the BIOS program will be correctly performed.

In the above embodiments of the invention, the address range of the CPU 210 is exemplified by 32 bits. That is, the default target address of the BIOS access instruction delivered from the CPU 210 ranges from 0xFFFFFFFFh to 0xFFF80000h (that is, 0xFFFFFFFFh subtracted by the size of the BIOS program (512K) and added by 1).

In the above embodiments of the invention, the default BIOS address corresponding to the BIOS data of the data segment B1 ranges from 0xFFFFFFFFh to 0xFFFE0000h. When the CPU 210 desires to access a BIOS data from the data segment B1, the default target address of the BIOS access instruction delivered from the CPU 210 ranges from 0xFFFFFFFFh to 0xFFFE0000h.

In the data segment B1, the BIOS data corresponding to the default BIOS addresses 0xFFFFFFFFh to 0xFFFE0000h are respectively stored in the memory segment M1 of the flash memory 250 whose flash memory type BIOS address ranges from 0x0001FFFFh to 0x00000000h, that is, the memory segment guaranteed correct when the flash memory 250 is produced.

For example, the BIOS data whose default BIOS address is 0xFFFFFFF0h is stored in the flash memory type BIOS address 0x0001FFF0h of the flash memory 250.

Let the memory access of the memory access system 200 in the above embodiments of the invention be exemplified by the BIOS access instruction delivered from the CPU 210 for initially executing the BIOS program. The default target address corresponding to the BIOS access instruction is a default BIOS address 0xFFFFFFF0h for example.

After the CPU 210 delivers a BIOS access instruction whose default target address is 0xFFFFFFF0h, the PCI slave 220 interprets the BIOS access instruction. After receiving the BIOS access instruction, the address converter 230 converts the default target address 0xFFFFFFF0h into a corresponding flash memory type target address 0x0001FFF0h and transmits the BIOS access instruction to the flash memory controller 240. The flash memory controller 240 accesses a BIOS data from the flash memory type target address 0x0001FFF0h accordingly, and transmits the accessed data to the CPU 210.

The BIOS program includes an address mapping table which is stored in the memory segment of the flash memory 250 exclusive of the memory segment M1. The address mapping table records the mapping relationship between the default BIOS address and the flash memory type BIOS address. The address converter 230 includes a register 231 for storing the address mapping table. The address converter 230 stores the address mapping table to the register 231, and converts the default target address into a corresponding flash memory type target address according to the address mapping table.

Figures 3, 4:
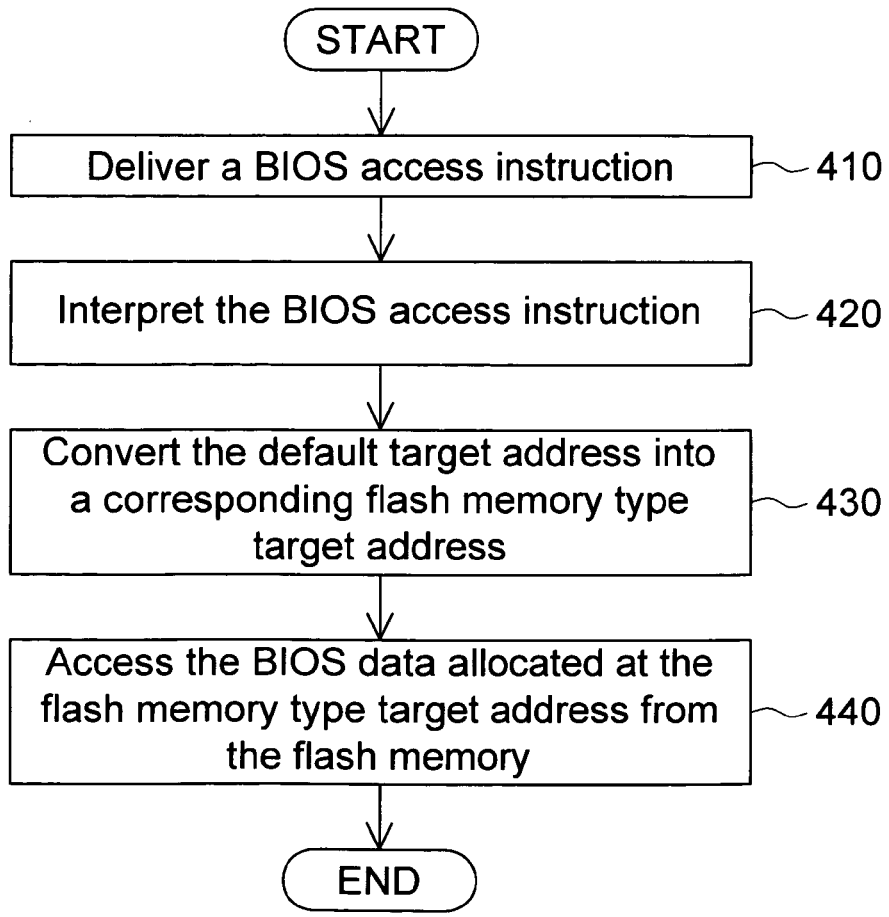
FIG. 3 is an example of an address mapping table used in a memory access system of an embodiment of the invention.
FIG. 4 is a memory access method according to an embodiment of the invention.

FIG. 3 is an example of an address mapping table used in a memory access system of an embodiment of the invention. The address mapping table 300 of FIG. 3 records the corresponding relationship between the default BIOS address corresponding to the BIOS data of the data segments B2, B3, B4 and the flash memory type BIOS address of the BIOS data. For example, the default BIOS address corresponding to the BIOS data of the data segment B2 ranging from 0xFFFDFFFFh to 0xFFFC0000h, respectively correspond to the flash memory type BIOS address ranging from 0x0003FFFFh to 0x00020000h. That is, in the data segment B2, the BIOS data corresponding to the default BIOS address ranging from 0xFFFDFFFFh to 0xFFFC0000h are respectively stored in address ranging from 0x0003FFFFh to 0x00020000h of the memory segment M2 of the flash memory 250. The mapping relationship between other data segments and memory segments is similar to the above disclosure and is not repeated here.

If the default target address corresponding to the BIOS access instruction is within the default BIOS address of the BIOS data of one of the data segments B2~B4, the address converter 230 obtains the flash memory type target address corresponding to default target address with reference to the address mapping table 300.

For example, when the address converter 230 receives a BIOS access instruction whose default target address is 0xFFFDFFFFh, (that is, the BIOS access instruction corresponding to the BIOS data of the data segment B2), the address converter 230 obtains the corresponding flash memory type target address whose address is 0x0003FFFFh with reference to the address mapping table 300.

The data segment B1 for initially executing the BIOS program is defaultly stored in the memory segment M1 of the flash memory 250 to assure that the BIOS program is correctly performed. Thus, in the above embodiments of the invention, the address mapping table 300 does not includes the corresponding relationship between the default BIOS addresses of the BIOS data of the data segment B1 and the flash memory type BIOS addresses. Thus, if the default target address of the BIOS access instruction is within the range of the default BIOS addresses corresponding to the BIOS data of the data segment B1, then the address converter 230 directly converts the default target address into the corresponding flash memory type target address without referring to the address mapping table 300.

The process of storing the address mapping table 300 in the register 231 by the address converter 230 is disclosed below. The data segment B1 includes a mapping table address, which corresponds to the address mapping table 300. During the stage when the CPU 210 initially executes the BIOS program, (that is, during the stage of accessing the BIOS data from the data segment B1), the address converter 230 stores the address mapping table 300 to the register 231 with reference to the mapping table address. Thus, when the CPU 210 delivers a BIOS access instruction to access the BIOS data in the data segments B2~B4, the address converter 230 converts the default target address of the BIOS access instruction into corresponding flash memory type target address according to the address mapping table 300.

According to the above disclosure, when the CPU 210 initially executes the BIOS program, that is, when the CPU 210 accesses the BIOS data of the data segment B1, the address converter 230 can convert address without referring to the address mapping table 300. Before the CPU 210 accesses the BIOS data from the data segments B2~B4, the address converter 230 stores the address mapping table 300 to the register 231. Therefore, when accessing the BIOS data from the data segments B2~B4, the address converter 230 can convert address according to the address mapping table 300.

In the above embodiments of the invention, the flash memory 250 is exemplified by a NAND flash memory. Generally speaking, due to the characteristics of the NAND flash memory, each memory segment of the NAND flash memory may be damaged after having been written for 100,000 times. In the above embodiments of the invention, the flash memory controller 240 detects whether the memory segment is damaged by using an error correction code (ECC). If the memory segment is detected as a damaged memory segment, the flash memory controller 240 repairs the BIOS data stored in the damaged memory segment, removes the BIOS data to a normal memory segment, and disables the damaged memory segment.

Besides, the flash memory controller 240 also correspondingly updates the address mapping table 300, so that the CPU 210 can correctly access the BIOS data stored in the above data segment. For example, if the memory segment M4 is detected as a damaged memory segment, then the flash memory controller 240 repairs the BIOS data of the data segment B4, and removes the BIOS data of the data segment B4 to an unused memory segment such as the memory segment M5 whose flash memory type BIOS address ranges from 0x000BFFFFh to 0x000A0000h. The flash memory controller 240 respectively stores the BIOS data, whose default BIOS address ranges from 0xFFFDFFFFh to 0xFFFC0000h, of the data segment B4 to the flash memory type BIOS address, ranging from 0x000BFFFFh to 0x000A0000h, of the memory segment M5. The flash memory controller 240 further corresponding updates the address mapping table 300.

Similarly, if the memory segment where the address mapping table 300 is stored is a damaged memory segment, then the flash memory controller 240 moves the address mapping table 300 to an unused normal memory segment. The flash memory controller 240 correspondingly updates the mapping table address as the flash memory type BIOS address corresponding to the above normal memory segment.

The advantage of the memory access system 200 disclosed in the above embodiments of the invention is disclosed below. The BIOS program is initially executed at the data segment B1 which is the most important data segment. It is assured that the BIOS program is properly executed if the data segment B1 is stored to the memory segment M1 which is guaranteed correct when the flash memory is produced.

Moreover, as the memory segment M1 may be damaged after having been written for 100,000 times, the number of writing the memory segment M1 has to be reduced so that the accuracy of the memory segment M1 is assured. In the above embodiments of the invention, the address mapping table 300 is stored in the memory segments exclusive of the memory segment B1. Therefore, if the memory segment is damaged and the address mapping table 300 needs to be updated, only the memory segment where the address mapping table 300 is allocated needs to be written and the memory segment M1 is not affected.

The mapping table address corresponding to the address mapping table 300 is stored in the memory segment M1. Therefore, if the memory segment where the address mapping table 300 is allocated is damaged after 100,000 times of writing, the memory segment M1 is written once for updating the mapping table address. According to the above disclosure, the memory access system 200 of the above embodiments of the invention stores the address mapping table 300 in the memory segment exclusive of the memory segment M1 and stores the mapping table address corresponding to the address mapping table 300 to the memory segment M1, largely reducing the possibility of writing the memory segment M1. Therefore, the lifespan of the memory access system of the above embodiments of the invention is largely prolonged.

In the above embodiments of the invention, the data segments B1~B4 are respectively stored in the memory segments M1~M4. In practical application, only the data segment B1 needs to be stored in the memory segment M1, and the data segments B2~B4 can be stored in other memory segments of the flash memory 250 and do not have to be stored in the memory segment M2~M4.

In the above embodiments of the invention, the BIOS program includes four data segments each is exemplified by 128 KB. However, in practical application, the size of the BIOS program and the number of data segments therein are not limited thereto.

FIG. 4 is a memory access method of an embodiment of the invention. The memory access method is used in the above memory access system 200 for accessing a BIOS program of the flash memory 250. Referring to FIG. 4. The method begins at step 410, a BIOS access instruction corresponding to a default target address is delivered. Afterwards, the method proceeds to step 420, the BIOS access instruction is interpreted. Next, the method proceeds to step 430, the default target address is converted into a corresponding flash memory type target address. Afterwards, the method proceeds to step 440, the BIOS data allocated at the flash memory type target address is accessed from the flash memory 250.

According to the memory access system disclosed in the above embodiments of the invention, the BIOS program is stored in a flash memory rather than in an electrically erasable programmable read-only memory used in a conventional memory access system, hence saving the use of costive electrically erasable programmable read-only memory. The memory access system of the invention uses the conventional CPU, and converts the default BIOS address corresponding to the BIOS access instruction delivered from the CPU into a flash memory type BIOS address. The BIOS program stored in the flash memory is accessed without replacing the conventional CPU. Therefore, the memory access system of in the above embodiments of the invention not only saves cost but also prolongs lifespan.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded to the broadest interpretation so as to encompass all such modifications and similar arrangements and procedures.

What is claimed is:

1. A memory access system for accessing a basic input output system (BIOS) program, the memory access system comprising:

a flash memory for storing a plurality of BIOS data of the BIOS program, wherein each of the BIOS data corresponds to one of default BIOS addresses and is allocated at one of flash memory type BIOS addresses, and the flash memory further stores an address mapping table recording the mapping relationship between the default BIOS addresses and the flash memory type BIOS addresses;

a CPU for outputting a BIOS access instruction corresponding to a default target address of the default BIOS addresses;

a peripheral component interconnect (PCI) slave (Slave) for interpreting the BIOS access instruction;

an address converter for receiving the BIOS access instruction delivered from the PCI slave and converting the default target address into a corresponding flash memory type target address according to the address mapping table, wherein the corresponding flash memory type target address is one of the flash memory type BIOS addresses; and a flash memory controller for receiving the BIOS access instruction delivered from the address converter and accessing the BIOS data allocated at the flash memory type target address accordingly.

2. The memory access system according to claim 1, wherein the BIOS program comprises a plurality of data segments, each of which comprises a part of the BIOS data; the flash memory comprises a plurality of memory segments respectively storing the data segments; the BIOS program is initially executed at a first data segment of the data segments, a first memory segment of the memory segments is the memory segment guaranteed correct when the flash memory is produced, wherein the first data segment is stored in the first memory segment.

3. The memory access system according to claim 2, wherein the address converter further comprises a register;
wherein the address converter stores the address mapping table to the register.

4. The memory access system according to claim 3, wherein the address mapping table records the corresponding relationship between the default BIOS addresses corresponding to the BIOS data and the flash memory type BIOS addresses allocated at a second to a N-th memory segment of the memory segments.

5. The memory access system according to claim 4, wherein if the default target address is allocated within the default BIOS addresses of the BIOS data of one of the second to the N-th data segment, then the address converter converts the default target address into the flash memory type target address according to the address mapping table.

6. The memory access system according to claim 4, the flash memory controller is for detecting and correcting the flash memory, and if one of the second to the N-th memory segment is damaged, then the flash memory controller corrects the data segment originally stored in the damaged memory segment and then stores the corrected data segment to another memory segment of the flash memory and correspondingly updates the address mapping table.

7. The memory access system according to claim 3, wherein the first data segment comprises a mapping table address corresponding to the address mapping table, and the address converter obtains the mapping table address from the first memory segment and refers to the mapping table address to obtain the address mapping table.

8. The memory access system according to claim 7, wherein the flash memory controller is for detecting and correcting the flash memory, and if the memory segment where the address mapping table is stored is a damaged memory segment, the flash memory controller corrects the address mapping table, stores the address mapping table to another memory segment of the flash memory, and correspondingly updates the mapping table address of the address mapping table.

9. The memory access system according to claim 3, wherein the address mapping table is stored in one of the memory segments of the flash memory exclusive of the first memory segment.

10. The memory access system according to claim 1, wherein the flash memory is a NAND flash memory, and the flash memory controller is a NAND flash memory controller.

11. A memory access method for accessing a basic input output system (BIOS) program in a flash memory, wherein the BIOS program comprises a plurality of BIOS data, each of which corresponds to one of default BIOS addresses and is allocated at one of flash memory type BIOS addresses, and the flash memory further stores an address mapping table recording the mapping relationship between the default BIOS addresses and the flash memory type BIOS addresses, the memory access method comprises:
delivering a BIOS access instruction, which corresponds to a default target address of the default BIOS addresses;
interpreting the BIOS access instruction;
converting the default target address into a corresponding flash memory type target address according to the address mapping table, wherein the corresponding flash memory type target address is one of the flash memory type BIOS addresses: and
accessing the BIOS data allocated at the flash memory type target address from the flash memory.

12. The memory access method according to claim 11, wherein the BIOS program comprises a plurality of data segments, each of which comprises a part of the BIOS data; the flash memory comprises a plurality of memory segments respectively storing the data segments; the BIOS program is initially executed at a first data segment of the data segments, and a first memory segment of the memory segments is the memory segment guaranteed correct when the flash memory is produced, wherein the first data segment is stored in the first memory segment.

13. The memory access method according to claim 12, wherein the address mapping table records the corresponding relationship between the default BIOS addresses corresponding to the BIOS data and the flash memory type BIOS addresses allocated at a second to a N-th memory segment of the memory segments.

14. The memory access method according to claim 13, wherein in the step of converting address, if the default target address is allocated within the default BIOS addresses of the BIOS data of one of the second to the N-th data segment, then the default target address is converted into the flash memory type target address according to the address mapping table.

15. The memory access method according to claim 12, wherein the first data segment comprises a mapping table address corresponding to the address mapping table.

* * * * *